C. F. WHITMAN.
AUTOMATIC CHUCK FOR SCREW MACHINES.
APPLICATION FILED MAY 20, 1920.
1,425,226.
Patented Aug. 8, 1922.
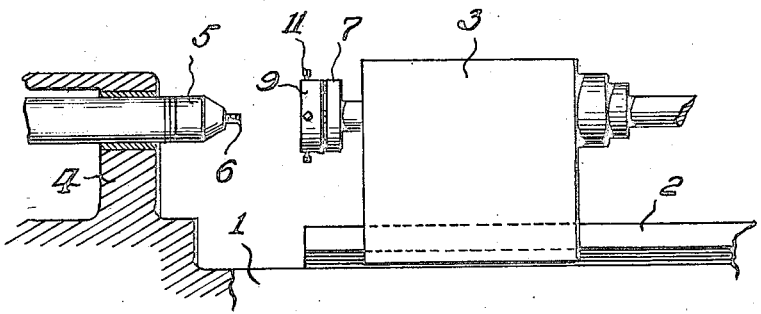
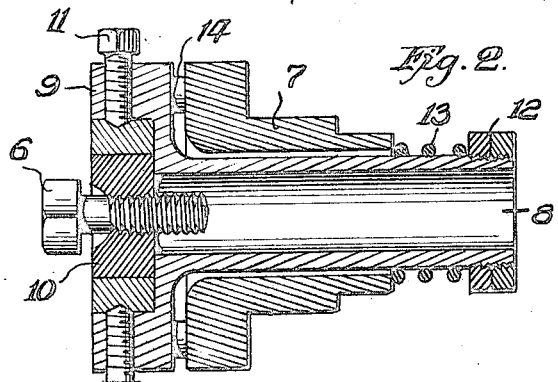
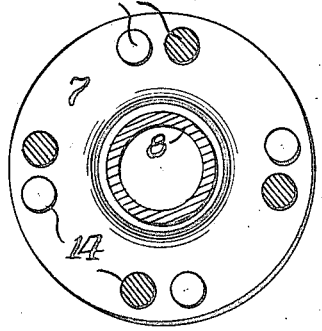
Inventor
Charles F. Whitman,

UNITED STATES PATENT OFFICE.

CHARLES F. WHITMAN, OF DETROIT, MICHIGAN, ASSIGNOR TO AUTOMATIC PRODUCTS COMPANY, OF DETROIT, MICHIGAN, A CORPORATION OF MICHIGAN.

AUTOMATIC CHUCK FOR SCREW MACHINES.

1,425,226.        Specification of Letters Patent.        Patented Aug. 8, 1922.

Application filed May 20, 1920.   Serial No. 382,689.

*To all whom it may concern:*

Be it known that I, CHARLES F. WHITMAN, a citizen of the United States of America, residing at Detroit, in the county of Wayne and State of Michigan, have invented certain new and useful Improvements in Automatic Chucks for Screw Machines, of which the following is a specification, reference being had therein to the accompanying drawings.

This invention relates to an automatic chuck for screw machines, and has special reference to that class of chucks for holding dies adapted for threading screws, bolts or the ends of rods or similar members, the threading operation being automatic so that screws may be expeditiously and economically produced by an automatic screw machine.

My invention aims to provide a die holding chuck which will permit of the die being driven for a threading operation and after the operation is performed the die holding portion of the chuck is released so that the screw or member being threaded may back the die off of the same and permit of the screw or member being removed from the machine. To accomplish this, the chuck is made in two parts normally maintained interlocked so that the parts of the chuck may be bodily reciprocated and rotated, particularly during a threading operation. With the parts of the chuck separable it is possible to retract the driven part and allow the remaining die holding part to be actuated or retracted by the screw or member operated upon.

My invention will be hereinafter considered in detail and then claimed, and reference will now be had to the drawing, wherein—

Figure 1 is a side elevation of the chuck as associated with a portion of the screw machine;

Fig. 2 is a longitudinal sectional view of the chuck showing the parts thereof interlocked;

Fig. 3 is a side elevation of the same showing the parts of the chuck separated, and Fig. 4 is a cross sectional view taken on the line IV—IV of Fig. 3.

In order that my invention may be understood, I show a portion of a machine screw bed 1 having shears or ways 2 for a reciprocable head stock 3 which may be manually or automatically shifted on the ways 2 to and from a tail stock 4, which is provided with a rotary screw chuck 5 adapted for holding a screw 6 or other member to be threaded.

The head stock 3 supports a driven chuck member 7 and concentrically of said chuck member is a tubular stem 8 of a die holding member 9, said die holding member having a conventional form of die 10 detachably held by set screws 11. The die 10 is adapted to thread the screw 6 and the tubular stem 8 provides clearance for the screw as the same is threaded.

On the inner end of the tubular stem 8 are abutments or nuts 12 and interposed between the driven chuck member 7 and said abutments is a coiled spring 13 which surrounds the tubular stem 8 so that its expansive force may hold the die chuck member retracted or in proximity to the driven chuck member 7.

The confronting faces of the chuck members 7 and 9 are provided with a series of studs or pins 14 serving functionally as jaws so that the chuck members may interlock for rotation in synchronism, the studs of the die chuck member 9 extending into the path of rotation of the studs of the driven chuck member 7 whereby said studs will contact and cause the die chuck member 9 to be driven in unison with the driven chuck member 7.

Considering the normal condition of the chuck, which is shown in Fig. 1, and assuming that the screw 6 is to be threaded, the head stock is fed towards the screw until the die 10 engages the same and advances thereon for threading purposes. During this operation the screw 6 is revolved at a greater speed than the die chuck and as the die takes hold of the screw it is carried outwardly from the driven chuck member 7 until the studs 14 are out of engagement and the spring 13 under compression, as shown in Fig. 3. Of course during this threading operation the head stock has been limited in its advance towards the tail stock, but the chuck member 7 is constantly driven. By the time the threading operation is completed the studs 14 are out of engagement and since the screw 6 is rotated at a greater speed than the driven chuck member 7, the die 10 will start to back off of the screw. It is at this point in the operation that the head stock 3 recedes so that the released die chuck member cannot interlock with the driven chuck member until the die 10 has left the screw, at which time the expansive force of the spring 13 causes the studs 14 to engage and establish a driving relation between the die and driven chuck members. By this time the head stock has completely receded and the threaded screw 6 can be removed so that another piece of stock may be operated upon.

I attach considerable importance to the simplicity of construction entering into the chuck, and particularly the automatic connection which is established between the chuck parts or members at predetermined periods during the operation of the chuck.

One embodiment of my invention has been illustrated, but it is to be understood that the structural elements are susceptible to such variations and modifications as fall within the scope of the appended claims.

What I claim is:—

1. A chuck of the type described, comprising a driven chuck member, a die chuck member, a tubular stem carried by said die chuck member and extending through said driven chuck member, studs on the confronting faces of said members adapted to interlock said chuck members for a driving relation, and a spring on said tubular stem against said driven chuck member and holding said die chuck member relative to said driven chuck member so that during the operation of said die chuck member it may be released from said driven chuck member and again interlocked therewith after each operation.

2. In a screw machine wherein a rotatable screw blank is adapted to be threaded by a die advancing towards the screw blank, means adapted to advance the die and revolve it at less speed than the screw blank, said means comprising a die chuck member supporting the die, a driven chuck interlocked with said die chuck for rotating it, a spring interposed between portions of said chuck members and maintaining an operative relation between said chuck members, said spring permitting said driven chuck to recede so that the die may be backed off the screw and allow said spring to establish a driving relation between said chuck members.

In testimony whereof I affix my signature in the presence of two witnesses.

CHARLES F. WHITMAN.

Witnesses:
  E. J. HOPPA,
  J. M. JOHNSON.